Aug. 21, 1962     R. M. BOVARD     3,049,812
RESPIRATORY METABOLISM SIMULATOR
Filed Jan. 30, 1961
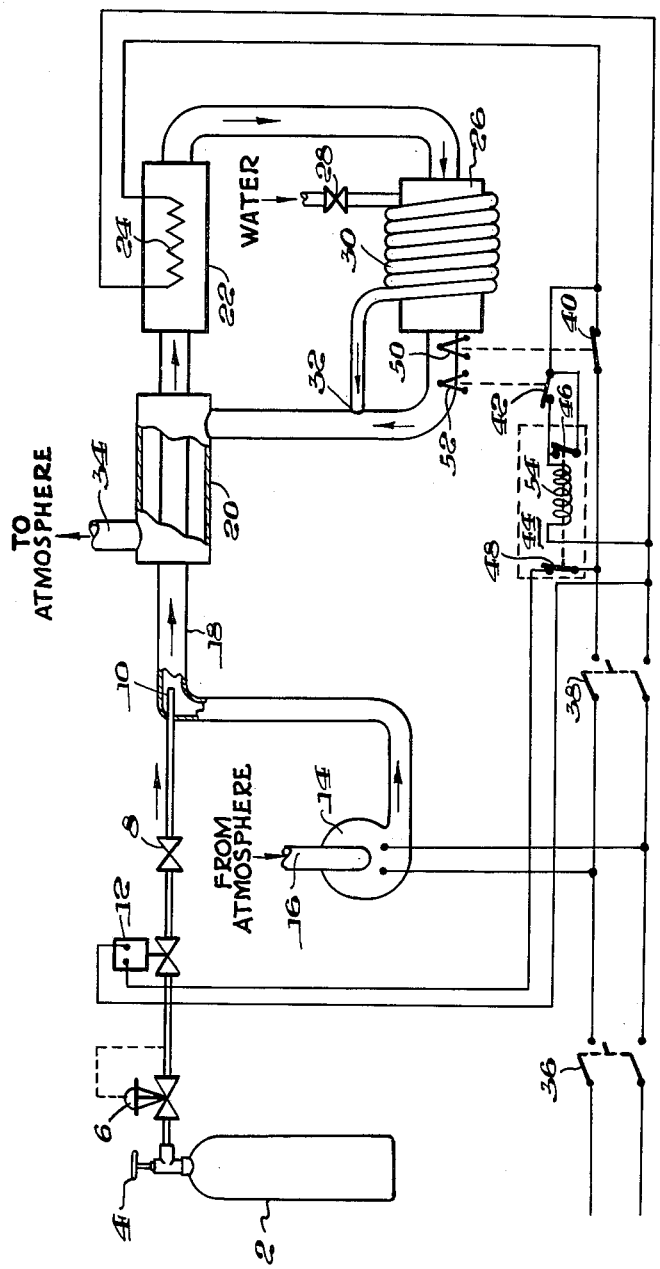
INVENTOR.
ROBERT M. BOVARD.
BY Ronald H. Shakely
his
AGENT 3,049,812
Patented Aug. 21, 1962

3,049,812
RESPIRATORY METABOLISM SIMULATOR
Robert M. Bovard, Evans City, Pa., assignor to M.S.A. Research Corp., Pittsburgh, Pa., a corporation of Pennsylvania
Filed Jan. 30, 1961, Ser. No. 85,755
3 Claims. (Cl. 35—19)

This invention relates to a respiratory metabolism simulator that consumes oxygen and produces carbon dioxide and water in amounts equivalent to the respiratory metabolism of animals.

With the advent of long range submarines and high altitude and space flight, there has been increased and extensive activity in developing systems for providing the respiratory requirements of humans to isolated chambers. Because of the need for complete reliability, these systems are and must be subjected to exhaustive testing; generally, new systems are first tested with animal subjects and then with human subjects to determine if the respiratory requirements are properly met. The maintenance of suitable animal colonies is a continuing nonproductive expense, and even after extensive testing with animal subjects, testing may be dangerous to the physical well being of human subjects. Animals consume oxygen and produce carbon dioxide and water vapor; systems providing respiratory requirements must conversely produce oxygen, remove carbon dioxide and, frequently, control, remove or utilize water vapor. Means to replace animals as subjects in testing such systems must consume oxygen and produce carbon dioxide and water vapor at the same rate as the animal simulated.

The primary object of this invention is to provide a means of artificially simulating the respiratory metabolism of animals, including humans, suitable to serve as a subject for testing life sustenance and environmental control systems. Other objects will be apparent from the following description and claims.

In the respiratory metabolism simulator of this invention a metered flow of an organic fuel is continuously mixed with sufficient atmosphere withdrawn from an isolated chamber, to form a non-explosive mixture, the mixture is flamelessly combusted by contact with a suitable combustion catalyst at an appropriate elevated temperature, the humidity of the resulting combustion products is adjusted if desired, and the combustion products are returned to the isolated chamber. The fuels suitable for use provide on combustion the same ratio of carbon dioxide produced to oxygen consumed as the respiratory quotient (RQ) of the animals or group of animals to be simulated. If the fuel does not produce the proper amount of water on combustion, the combustion products are humidified or dehumidified in the desired amount. Any organic fuel providing the desired $CO_2$ produced/$O_2$ consumed ratio is suitable for use, although it is most convenient and preferred to use gaseous or vaporized liquid fuels.

The accompanying drawing diagrammatically shows an artificial metabolism simulator.

Referring now to the drawing, which illustrates a preferred embodiment of this invention using pressurized gaseous fuels, the fuel metering and supply portion comprises a fuel supply tank 2 having a shut-off valve 4, a constant pressure supply valve 6, a precision metering needle valve 8, and a discharge nozzle 10. Solenoid valve 12 is operatively connected as is later described to close the fuel supply line in the event of improper combustion to prevent a potentially hazardous build-up of fuel in the isolated atmosphere.

A blower 14, having an inlet conduit 16 opening from the isolated atmosphere, forces atmosphere through conduit 18 where the fuel-atmosphere mixture is formed. The mixture is preheated in heat exchanger 20 by the discharging combustion products, and is further preheated if required in chamber 22 by electrical heater 24. The preheated fuel-atmosphere mixture is then passed through chamber 26 containing combustion catalyst where the fuel is completely combusted without flame. The humidity of the combustion gases is adjusted to contain an amount of water equal to that in the expired breath and, if desired, the water evaporated from the skin of the animal simulated. The figure shows one method of humidifying the combustion gases, as is generally required. Water is introduced at the desired rate, which is controlled by metering valve 28, to a coil 30 surrounding the combustion catalyst chamber. The heat transferred from the chamber vaporizes the water, and it is introduced into the combustion gas stream at intersection 32. The humidified combustion gases are returned to the isolated atmosphere through the shell side of heat exchanger 20 and conduit 34.

In the operation of the metabolism simulator, the fuel shut-off valve 4 is opened, and constant pressure supply valve 6, and metering valve 8, are adjusted to give the desired fuel flow rate; solenoid valve 12 is in its normally closed position preventing any fuel flow. Main power switch 36 is closed activating blower 14, which withdraws isolated atmosphere from a closed chamber or the like (not shown), forces it through the simulator, and returns it to the chamber through conduit 34. Switch 38 is then closed activating the control and heating circuits, which comprise normally closed temperature actuated switches 40 and 42, relay 44 having normally open switch 46 and normally closed switch 48, heater 24, and solenoid valve 12. Switches 40 and 42 are activated by suitably amplified signals from thermocouples 50 and 52 respectively; or more conveniently, these switches may be bimetallic thermoswitches in the stream of combustion products or imbedded in the catalyst bed. Switches 40 and 42 open at preselected elevated temperatures necessary for complete catalytic combustion; switch 40 opens at a preselected upper temperature and switch 42 opens at a preselected lower temperature. Closing switch 38 provides power through normally closed switch 40 to heater 24, and through normally closed switch 42 to energize coil 54 of the relay 44. The energized coil closes locking switch 46, and opens the normally closed switch 48, so that the normally closed solenoid 12 is not energized. The heater 24 heats the atmosphere stream and thereby the catalyst bed 28; switch 42 opens when the catalyst bed reaches the preselected lower temperature, but relay coil 54 remains energized by lock-in switch 46. When the preselected upper temperature, or heater control temperature is reached, switch 40 opens disconnecting heater 24 and de-energizing relay coil 54, thereby opening associated lock-in switch 46 and permitting switch 48 to return to its normally closed position energizing and opening solenoid valve 12, permitting the flow of fuel through nozzle 10 into the flowing atmosphere stream.

The fuel and atmosphere are line mixed in conduit 18, and pass through preheaters 20 and 22 to the catalyst bed 28, where the mixture is flamelessly combusted. In the event the catalyst bed temperature falls below the maximum preselected upper temperature switch 40 automatically closes and energizes heater 24; if the heater fails or is unable to maintain at least the preselected low temperature, switch 42 closes and de-energize solenoid valve 12 stopping the fuel flow.

Although suitable for any purpose in which the simulation of respiratory metabolism is desired, it is now expected that this invention will be primarily useful as a subject in testing the performance of systems which provide respiratory requirements to isolated atmospheres. Oxygen concentration is routinely determined in such tests and in the event the desired oxygen concentration is not maintained the respiratory metabolism simulator may be automatically or manually turned off by interrupting the power supply to it. Also, any accumulation of uncombusted fuel, caused either by malfunction of the simulator or failure of the respiratory requirement supply system being tested, may be detected by conventional use of a combustible gas alarm or control.

Any gaseous vaporized liquid or liquid fuel can be used with appropriate conventional modification of the fuel supply and mixing portions of the device, as is apparent to those skilled in the art. Suitable fuels must on combustion form only carbon dioxide or carbon dioxide and water, that is, they must contain only carbon and hydrogen and/or oxygen; the desired respiratory quotient is obtained by selecting the proper fuel or mixture of fuels. Illustrative of suitable fuels simulating different respiratory quotients are:

| RQ=0.67 | RQ=0.80 | RQ=1.0 | RQ=2.0 |
| --- | --- | --- | --- |
| Methyl alcohol. | Acetylene. | Formaldehyde. | Carbon monoxide. |
| Ethylene. | Acetaldehyde. | Carbon. | |
| Propane. | Ethylene oxide. Glycol. | | |

The fuel flow rate is adjusted to provide an amount of $CO_2$ equivalent to that produced by the animal simulated; animals at rest or active, or groups of animals, may be simulated by suitably varying the rate. The various desired flow rates may be provided by manually or automatically adjusting a metering valve, by selection of separate parallel preset metering valves, or other conventional methods, including automatic programming. The fuel rate and atmosphere circulation rate are adjusted so that the mixture of the two contains an amount of fuel well below the lower explosive limit.

Any of a variety of well known combustion catalysts may be used to effect the combustion of the fuel-atmosphere mixture in the usual manner; e.g., noble metal catalysts such as heated filaments or screens, or platinized asbestos or silica gel, and metal oxide catalysts, such as copper oxide or mixed metal oxide granules.

In most cases the combustion produces an amount of water less than that produced by the animal being simulated; so it is generally desired to humidify the combustion products. It is preferred to utilize the heat produced on combustion to vaporize the water to be added, so that the thermal output of the simulated animal is approximated. This may be accomplished in a variety of ways different from that shown in the drawing which will be apparent to those skilled in the art; for example, the combustion chamber may be used as a heating element in a steam generator, or all or a selected portion of the combustion gases may be passed through water or by a water soaked wick. Dehumidification similarly is accomplished by conventional methods such as passing all or a portion of the combustion products through a drying bed. In applications in which it is necessary to provide an exact thermal simulation of the animal, the gases returned to the isolated chamber are suitably heated or cooled.

The following example describes the simulation of a chimpanzee according to this invention. A chimpanzee has a respiratory quotient of 0.80; an average size chimpanzee at rest consumes about 10.4 liters (STP) of oxygen per hour producing 8.3 liters of carbon dioxide and 42.3 liters of water vapor per hour. Acetylene is used as a fuel; it produces 0.8 mole of carbon dioxide for each mole of oxygen consumed according to the equation $$C_2H_2 + 5/2 O_2 \rightarrow 2CO_2 + H_2O$$

which is equivalent to the chimpanzee RQ. The fuel flow control valves are adjusted to provide a flow of 3.42 grams of acetylene per hour, which produces on combustion 16.32 grams of carbon dioxide per hour, or 8.3 liters per hour. The blower is of sufficient size to force at least about 65 liters per hour of isolated atmosphere through the simulator to insure that the fuel-atmosphere mixture contains an amount of acetylene less than the lower explosive limit. A shell and single-tube heat exchanger and 250 watt electrical heater are used to preheat the fuel-atmosphere mixture (atmosphere only on start-up) which is combusted in a catalyst bed comprising a 3 inch x 3 inch diameter can containing a granulated mixed metal oxide catalyst which completely combusts the mixture at a temperature above about 300° F. The upper temperature limit control is set to open at 350° F. and the lower temperature limit control is set to open at 300° F., to insure, as previously described, the complete combustion of the fuel. The combustion of acetylene produces only 2.37 grams of water per hour, but about 34 grams per hour (42.3 liters) are produced by a chimpanzee. Additional water is supplied by feeding water at the rate of 31.6 grams per hour to the evaporating coil and vaporizing it into the combustion gas stream.

According to the provisions of the patent statutes, I have explained the principle and mode of practicing my invention and have described what I do now consider its best embodiment. However, I desire it to be understood that, within the scope of the appended claims, the invention may be practiced otherwise than as specifically described.

I claim:

1. A method of simulating the respiratory metabolism of animals which comprises completely combusting a mixture of an organic fuel and isolated atmosphere containing oxygen, consuming said fuel at a rate which on combustion produces carbon dioxide at the same rate as the animal to be simulated, said fuel containing carbon and at least one element from the group consisting of hydrogen and oxygen, adjusting the humidity of the resulting combustion products to provide a ratio of water to carbon dioxide equal to that produced by the animal, and returning said combustion products to said isolated atmosphere.

2. A simulator for simulating the respiratory metabolism of animals comprising means for metering a fluid organic fuel at a predetermined rate to supply carbon at a rate equal to the rate of carbon dioxide production of the animal to be simulated, means for supplying atmosphere from an isolated chamber to said metered fuel, means for mixing said metered fuel and isolated atmosphere, means for catalytically completely combusting the mixture of fuel and isolated atmosphere, means for adjusting the humidity of the resultant combustion products to provide and maintain a water-carbon dioxide ratio equal to that produced by the animal, and means for returning said combustion products to said isolated chamber.

3. A simulator for simulating the respiratory metabolism of animals comprising a pressurized gaseous organic fuel supply, means for metering said fuel at a predetermined rate to provide carbon at a rate equal to the rate of carbon dioxide production of the animal to be simulated, means for supplying atmosphere from an isolated chamber to said metered fuel, means for mixing said metered fuel and atmosphere, electrical means for heating the fuel-atmosphere mixture, means to completely combust said mixture, said combustion means comprising a metal oxide combustion catalyst bed, a high-limit temperature sensing means responsive to said catalyst bed temperature and connected to said heating means to stop its operation when a predetermined high temperature is reached, a solenoid valve to open and close said fuel supply, a low-limit temperature sensing means connected to said solenoid valve to close said fuel supply when a predetermined low temperature is reached, means to humidify the combustion products to provide and maintain a water to carbon dioxide ratio equal to that produced by the animal, said humidifying means comprising means to transfer the heat generated by combustion to vaporize water, and means to return said combustion products to said isolated chamber.

References Cited in the file of this patent

UNITED STATES PATENTS

| | | |
|---|---|---|
| 2,759,802 | Potter et al. | Aug. 21, 1956 |
| 2,871,107 | Hartman | Jan. 27, 1959 |